Oct. 23, 1962    E. KEZNICKL    3,059,534
ADJUSTING DEVICE FOR AN OBJECTIVE
Filed Dec. 1, 1959

United States Patent Office 3,059,534
Patented Oct. 23, 1962

3,059,534
ADJUSTING DEVICE FOR AN OBJECTIVE
Eduard Keznickl, Vienna, Austria, assignor to Alois Handler and Karl Vockenhuber, both of Vienna, Austria
Filed Dec. 1, 1959, Ser. No. 856,501
Claims priority, application Austria Jan. 8, 1959
3 Claims. (Cl. 88—57)

This invention relates to cameras and more particularly to an objective of variable focal length.

Known devices for adjusting objectives of variable focal length generally use worm gears disposed circumferentially and concentrically with the objective. The pitch of the gears corresponds to the desired focal length adjustment motion of the objective. In order to focus the objective another concentric device is generally provided. These known devices have the disadvantage that the double adjustment of an objective is difficult to accomplish and the devices are complex, and expensive to manufacture. Their complexity and construction renders these devices susceptible to misadjustment and easy damage.

A principal object of the present invention is to provide an improved adjusting device for objectives of variable focal length which is simple and cheap to construct yet is capable of having high adjustment precision.

Another object of the invention is to combine the objective focusing device of the camera with an adjusting device for variably controlling the focal length of the objective in a simple manner.

A feature of the invention is the provision of an adjusting device for objectives of variable focal length, for zoom cameras, comprising several objective elements in the form of a positive front lens and a negative lens having a common optical axis with a positive rear lens and arranged for movement in said axis relative to each other and relative to the positive rear lens. The positive front lens is controlled by a mechanical adjusting means comprising a lever which is pivotally mounted on a pivot and is capable of adjusting the focal length by moving parallel to the optical axis under control of a cam. The pivot of the lever is mounted so as to be movable parallel to the optical axis of the objective so that focusing is accomplished by moving the pivot and the respective lens element accomplishes a supplementary motion above and beyond the adjustment motion of the focal length. A separate manually controlled adjusting device is provided for focusing by movement of the positive lens.

Another feature of the invention is the provision of still another mechanical adjusting means comprising a crank drive connected to the negative lens. The crank drive is driven by a shaft which rotates the cam. The crank drive is thereby coupled to the cam shaft so that both lenses effect coordinated simultaneous axial movements. The crank drive has its dead center in a condition of adjustment of the focal length in which varying of the focal length causes the speed of travel of the positive lens to have a maximum value.

The provision of the crank drive permits control of the negative lens in its axial movement proportional to the varying of the focal length and the positive front lens is able to make a quick movement under control of the cam and is returned back to the original focused position slowly.

In devices heretofore known the quick movement of the positive lens required a cam surface having a radical change of cam radius during very small angles of cam rotation thereby tending to jam the adjustment mechanism. This disadvantage in known devices is eliminated by the coupling of the controls of the adjusting mechanisms of the two lenses through the cam shaft so that the dead center of the crank drive is in a condition heretofore mentioned with respect to the axial movement of the positive front lens whereby the radius of the cam surface controlling the positive front lens need not be so radically changed within a few degrees of arc.

Other features and advantages of the objective of variable focal length according to the invention will be better understood as described in the following specification and appended claims, in conjunction with the following drawings, in which:

Figure 1:
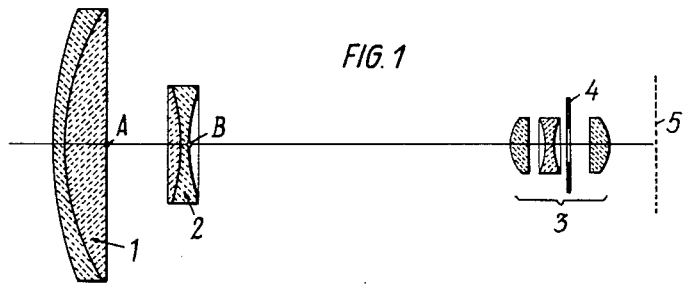
FIG. 1 is a diagrammatic longitudinal section of an objective of variable focal length according to the invention for illustrating the principles of the invention.

According to the drawing, the objective of variable focal length comprises a positive front lens 1 and a negative lens 2 and a positive rear lens assembly 3 all arranged on a common optical axis. The lenses 1 and 2 are movable relative to each other and relative to the lens objective element 3 for taking exposures through a diaphragm 4 on a film diagrammatically illustrated by a line 5.

Figure 2:
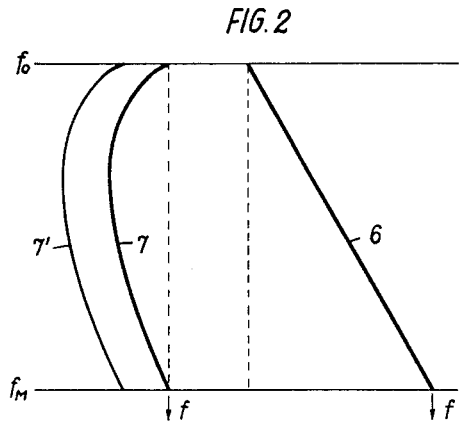
FIG. 2 is a diagram for graphically illustrating the movements of the different objectives as a function of focal length variation.

The rear lens elements 3 comprise a plurality of lenses as illustrated and the diaphragm 4. The objective is illustrated in FIG. 1 in an initial or start position of the movable lenses. In this setting the objective has its minimum focal length $f_0$. Mechanisms, later described, are provided for moving the lenses axially and the design of the objective is such that during axial movement of the negative lens 2 the focal length of the overall objective system is changed in proportion to the distance covered by that lens. In order to keep the position of the image constant when the focal length is changed, the positive lens must be shifted according to a hyperbolic law of motion. In FIG. 2 the axial travel of the positive and the negative lenses are shown in dependence of the focal length. In the diagram, the axial travel is in direction of the abscissa, and the pertaining focal lengths correspond to the ordinate. A curve 7 indicates the axial travel of a point A of the positive lens 1, a straight line 6 illustrates the movement of a point B of the negative lens 2 in dependence of the focal length. It is apparent from the curve 7 that starting from a focal length $f_0$, when the focal length is changed, first of all a rapid forward movement of the positive lens 1 occurs, and that the movement reaches its maximum value at a medium focal length. On further increase of the focal length the lens 1 is moved backwards and arrives at its original position at the maximum focal length setting $f_m$. The curve 7 indicates the axial travel of point A of the positive lens when the objective is set to infinity. A curve 7' indicates the axial travel of the same point A when a near object is focused.

When a closeup exposure of an object is being taken focusing of the camera, not shown, is required and the complete front objective element 1 is moved, for example, at a rate corresponding to the curve 7' which is representative of the course of movement of a point A of the front objective element 1 under control of focal length adjusting mechanism and after focusing adjustment by means hereinafter described for variably adjusting focusing of the objective.

Figure 3:
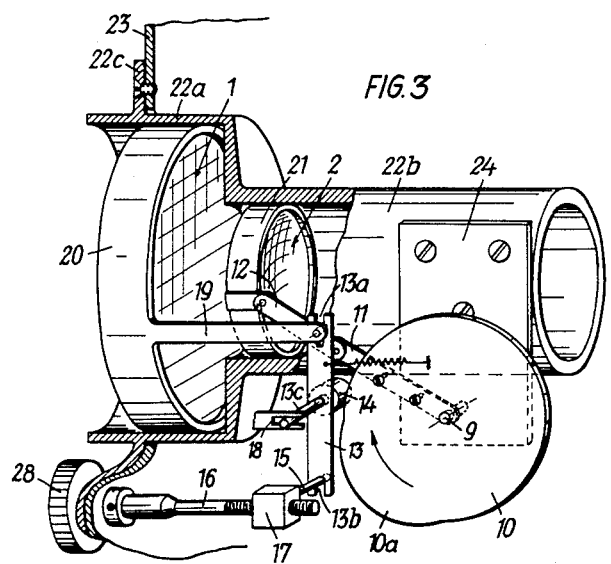
FIG. 3 is a perspective view partly cut away illustrating construction of an embodiment of the objective according to the invention.

An embodiment of the invention is illustrated in FIG. 3. The positive front lens 1 is mounted in an annular ring member 20 and the negative lens 2 is mounted in a smaller annular ring member 21. The ring 20 is mounted for axial movement in an enlarged portion 22a of a tube and the member 21 is mounted for axial movement in a portion 22b of the tube having a reduced diameter. The two tube portions are coaxial and the lenses have their optical axes coincident. The tube is provided with a radial flange 22c secured to a part 23 of the camera illustrated fragmentarily.

A plate 23 is mounted externally of the tube mounting the two lenses for axial movement relative to each other. A rotatable shaft 9, actuatable, for example, manually from externally of the camera by means, not shown, is pivoted on plate 24. The shaft 9 is secured to a first mechanical adjusting mechanism for the positive front lens comprising a cam 10 having an enlarged profile portion 10a engageable with a cam follower 14 secured to a shaft 13c which extends through a pivotally mounted lever 13. The lever 13 is coupled to the annular ring or lens mount 20 by an arm 19 connected to the ring 20 and having a pin 13a in an end slot of the lever 13 as illustrated. The lever 13 has a lower slot 13b through which extends a pivot 15 normal to the optical axis of the two lenses 1 and 2.

The pivot 15 is movable in the direction of the axis under control of a knob 28 having a shaft 16 secured thereto and threaded at the outermost end thereof opposite to the knob 28. The shaft 16 passes through an internally threaded block 17 so that upon rotation of the knob 28 the block 17 moves axially along the shaft 16 and moves the pivot 15 parallel to the optical axis thereby shifting the pivot point of member 13 for operation as hereinafter described.

A second mechanical adjusting means is provided for moving the negative lens 2 and comprises a crank lever having two lever arms 11 and 12. The arm 12 is connected to the ring 21 as illustrated. The lever arms 11 and 12 are pivoted at a common connection and the crank lever 11 has an end portion fixed to the shaft 9 that rotates the cam 10 so that in operation the shaft 9 is able to cause the two mechanical adjusting means for the lenses to effect in operation simultaneous axial movement of the two lenses relative to each other and relative to the fixed positive rear lens for varying the focal length of the objective as hereinafter described.

As the cam 10 is rotatably driven by rotating shaft 9 the crank drive 11, 12 reaches its dead center position when the cam is in position to carry out the movement of the front lens 1 as illustrated in FIG 3. As the cam continues its rotation for focal length adjustment the camming portion 10a having the maximum radius controls the movement of the lens 1 by camming the cam follower 14 and actuating the lever 13 in movement parallel to the optical axis under guided control of a guide 18.

The pivot member 15 and the block 17 and knob 28 and its shaft form means for variably adjusting the pivot 15 to selected different positions parallel to the optical axis and thereby focusing the objective. The knob may be provided with a focusing scale, for example. The pivot is spaced from the cam follower 14, which provides a point of contact for engagement of the cam follower and the cam, so that movement of the pivot 15 parallel to the optical axis under control of the knob 28 causes an additional turning of the lever around the point of engagement of the cam and cam follower when the objective is focused by variable rotation of the knob 28 and then the focal length adjustment movement carried by the above described mechanisms.

It can thus be seen that the coordination of the crank drive and the cam drive is arranged in such a manner that the start of the quick movement of the front objective element corresponds with the dead center position of the crank drive whereby the relative angular rotation of the shaft 9 with the adjustment of the focal length is simplified and an essentially flatter camming profile of the cam curve or surface is permitted whereby the drives are more easy to manufacture and jamming of the cam drive is avoided.

The adjusting mechanisms according to the invention are particularly applicable to objectives of variable focal length arranged recessed in the camera housing or casing and with the film plane situated in a rear wall of the camera.

While a preferred embodiment of the invention has been shown and described it will be understood that many modifications and changes can be made within the true spirit and scope of the invention.

What I claim and desire to secure by Letters Patent is:

1. An objective of variable focal length comprising, at least one fixed lens and at least two lenses disposed axially spaced in a common optical axis and arranged for axial movement relative to said fixed lens and relative to each other, mechanical adjusting means operable to effect simultaneous axial movement of said two lenses for varying the focal length of the objective comprising a first mechanical adjusting means to effect an axial movement of a first one of said movable lenses and a second mechanical adjusting means to effect an axial movement of a second one of said two movable lenses, and means to cause said two mechanical adjusting means to effect in operation simultaneous axial movement of said two-movable lenses, said first adjusting means comprising a lever coupled to said first one of said movable lenses, a pivot movable in opposite directions parallel to said optical axis pivotally mounting said lever, said pivot having an axis extending at right angles to said optical axis and spaced therefrom in a direction normal to said optical axis, a driven cam cooperating with said lever in operation for selectively pivoting said lever on said pivot parallel to said axis, said pivot being spaced from a point of engagement of said lever by said cam drive so that said parallel movement of said pivot causes an additional turning of said lever around said point of engagement by said cam drive, and an adjusting device for variably controlling the movement of said pivot parallel to the optical axis for positioning said pivot in selected different positions parallel to said optical axis focusing the objective by additional movement of said first one of said lenses coupled to the lever in a direction parallel to said optical axis with said cam drive.

2. An objective as claimed in claim 1, in which said first mechanical adjusting means for varying the focal length of the objective, further comprises, means provided on said lever engaged by said cam drive at said engaging point of the cam drive, guide means for said last-mentioned means constructed so that said point of the lever is movable only parallel to said optical axis, other coupling means providing coupling of said lever to the corresponding first lens and to said pivot disposed at right angles to the longitudinal direction of said lever and in planes at right angles to the optical axis permitting relative movement in the longitudinal direction of said lever.

3. An objective of variable focal length comprising a positive front lens, a negative lens and a positive rear lens arranged on a common optical axis, two coaxial axially movable annular members, a supporting tube, said two annular members being disposed for coaxial movement in said supporting tube, said two movable members comprising a first annular member enclosing the positive front lens and a second annular member enclosing the negative lens, the common axis of said annular members being coincident with said optical axis, mechanical adjusting means operable to effect simultaneous axial movements of the positive front lens and the negative lens relative to each other and relative to the fixed positive rear lens comprising, a first mechanical adjusting means operable to effect an axial movement of said positive lens, a second mechanical adjusting means operable to effect an axial movement of said negative lens, and means to cause said two mechanical adjusting means to effect in operation simultaneous axial movement of said two lenses relative to each other and relative to said fixed positive rear lens for varying the focal length of the objective, said second mechanical adjusting means comprising a crank drive for controlling the movement of said second annular member enclosing the negative lens, said first mechanical driving means comprising a driven cam, a lever coupled to said first annular member enclosing the positive front lens, a pivot pivotally mounting the lever, said pivot having an axis extending at right angles to the optical axis, a cam follower cooperating with said lever and cam for selectively pivoting the lever on said pivot parallel to said axis in response to actuation of said cam, said pivot being spaced from a point of engagement of said cam follower by said cam so that said parallel movement of the pivot causes an additional turning of said lever around said point of engagement of said cam and cam follower, an adjusting device for variably controlling the movement of said pivot parallel to said optical axis for positioning said pivot in selected different positions parallel to said optical axis, thereby focusing the objective by additional movement of said positive front lens, and said crank drive having its dead center position corresponding to a start position of adjustment of focal length in which on varying the focal length, the speed of axial travel of said positive front lens has a maximum value.

References Cited in the file of this patent
FOREIGN PATENTS

| | | |
|---|---|---|
| 725,513 | France | Feb. 15, 1932 |
| 1,138,364 | France | Jan. 28, 1957 |
| 1,214,295 | France | Nov. 9, 1959 |
| 362,789 | Great Britain | Dec. 10, 1931 |
| 321,153 | Switzerland | June 15, 1957 |